US012312133B2

(12) United States Patent
Yu et al.

(10) Patent No.: US 12,312,133 B2
(45) Date of Patent: May 27, 2025

(54) BUFFER STRUCTURE, PACKAGING SET, AND BUFFER STRUCTURE FORMING METHOD

(71) Applicant: Wistron NeWeb Corporation, Hsinchu (TW)

(72) Inventors: Pei Shan Yu, Hsinchu (TW); Hsiao Hsuan Huang, Hsinchu (TW); Wei Chun Chen, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 0 days.

(21) Appl. No.: 18/173,206

(22) Filed: Feb. 23, 2023

(65) Prior Publication Data

US 2024/0043164 A1 Feb. 8, 2024

(30) Foreign Application Priority Data

Aug. 5, 2022 (TW) ................................ 111129623

(51) Int. Cl.
*B65D 5/50* (2006.01)
*B31B 50/26* (2017.01)
*B31B 50/81* (2017.01)
*B31B 110/35* (2017.01)
(Continued)

(52) U.S. Cl.
CPC ............ *B65D 5/5045* (2013.01); *B31B 50/26* (2017.08); *B31B 50/81* (2017.08); *B65D 5/503* (2013.01); *B65D 5/5047* (2013.01); *B31B 2110/35* (2017.08); *B31B 2120/102* (2017.08); *B31B 2120/40* (2017.08)

(58) Field of Classification Search
CPC ..... B31B 50/26; B31B 50/81; B31B 2110/35; B31B 2120/40; B31B 2120/102; B65D 5/50; B65D 5/503; B65D 5/5045; B65D 5/5047
USPC ................................ 206/521, 588, 592, 594
See application file for complete search history.

(56) References Cited

U.S. PATENT DOCUMENTS 2,513,902 A * 7/1950 Tyrseck .................. B65D 5/58 206/521
3,119,542 A * 1/1964 Pomerantz .......... B65D 5/5045 206/594
(Continued)

FOREIGN PATENT DOCUMENTS

CN 210311297 U 4/2020
JP 2005239225 A 9/2005
KR 101026850 B1 * 4/2011 ............ B65D 81/38

*Primary Examiner* — Bryon P Gehman
(74) *Attorney, Agent, or Firm* — McClure, Qualey & Rodack, LLP

(57) ABSTRACT

A buffer structure includes at least one internal main layer, at least one external main layer, and a rib portion. An inner side of the at least one internal main layer forms an accommodating space, and the at least one external main layer surrounds an outer side of the at least one internal main layer. The rib portion is located between two first folding lines and forms a ring shape. The two first folding lines are parallel to each other. One of the two first folding lines is connected to the at least one internal main layer, and the other one of the two first folding lines is connected to the at least one external main layer. The rib portion is connected between the at least one internal main layer and the at least one external main layer.

17 Claims, 9 Drawing Sheets

(51) Int. Cl.
*B31B 120/10* (2017.01)
*B31B 120/40* (2017.01)

(56) References Cited

U.S. PATENT DOCUMENTS

| | | | | |
|---|---|---|---|---|
| 4,177,935 | A * | 12/1979 | Centanni | B65D 5/566 229/122.34 |
| 6,189,777 | B1 * | 2/2001 | Hutchinson | B65D 77/042 229/120.37 |
| 6,892,933 | B2 * | 5/2005 | Sullivan, Jr. | B65D 5/566 220/23.91 |
| 2003/0102361 | A1 | 6/2003 | Terashima et al. | |
| 2023/0131560 | A1 * | 4/2023 | Blezard | B31B 50/00 493/89 |

* cited by examiner

BUFFER STRUCTURE, PACKAGING SET, AND BUFFER STRUCTURE FORMING METHOD

RELATED APPLICATIONS

This application claims the benefit of priority to Taiwan Patent Application No. 111129623, filed on Aug. 5, 2022. The entire content of the above identified application is incorporated herein by reference.

BACKGROUND

Technical Field

The present disclosure relates to a buffer structure, a packaging set, and a buffer structure forming method, and more particularly, to a buffer structure with at least two layers, a packaging set having the buffer structure with at least two layers, and a forming method of the buffer structure with at least two layers.

Description of Related Art

With the advancement of technology and the convenience in everyday life, the usage of packing set or packing materials for storing or transporting items has increased immensely, and at the same time, there is a demand for packing sets with low cost, high packing efficiency, and good protection. For example, a conventional buffer structure in the box of a packing set is mostly a single-layer design, which is weak in strength and uneasy to make by labor force, and so it would take more time and higher labor cost to assemble the conventional packing set. Hence, the conventional buffer structure cannot meet the stringent requirements of being low cost, having high packing efficiency, and providing good protection.

In view of this, the development of a buffer structure and a packaging set that are low in cost, high in packing efficiency, and good at protecting items is in dire need for the market.

SUMMARY

According to one aspect of the present disclosure, a buffer structure includes at least one internal main layer, at least one external main layer, and a rib portion. The internal main layer has an inner side and an outer side, the inner side forms an accommodating space, and the external main layer surrounds the outer side of the internal main layer. The rib portion is located between two first folding lines. The two first folding lines are parallel to each other, one of the first folding lines is connected to the internal main layer, and the other one of the two first folding lines is connected to the external main layer. The rib portion is connected between the internal main layer and the external main layer and forms a ring shape.

According to another aspect of the present disclosure, a packaging set includes the buffer structure described above and a case body. The case body is disposed at and connected to an inner side or an outer side of the buffer structure.

According to yet another aspect of the present disclosure, a buffer structure forming method includes a structural material providing step, a first folding step, a rib portion forming step, and an accommodating space forming step. In the structural material providing step, a structural material is provided, and the structural material includes two first folding lines configured to be folded to form a buffer structure. The first folding step includes folding along one of the first folding lines to form an internal main layer and folding along the other one of the first folding lines to form an external main layer. The rib portion forming step includes forming a rib portion between the two first folding lines. In the accommodating space forming step, an accommodating space is formed by an inner side of the internal main layer, the external main layer surrounds an outer side of the internal main layer, and the rib portion forms a ring shape.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
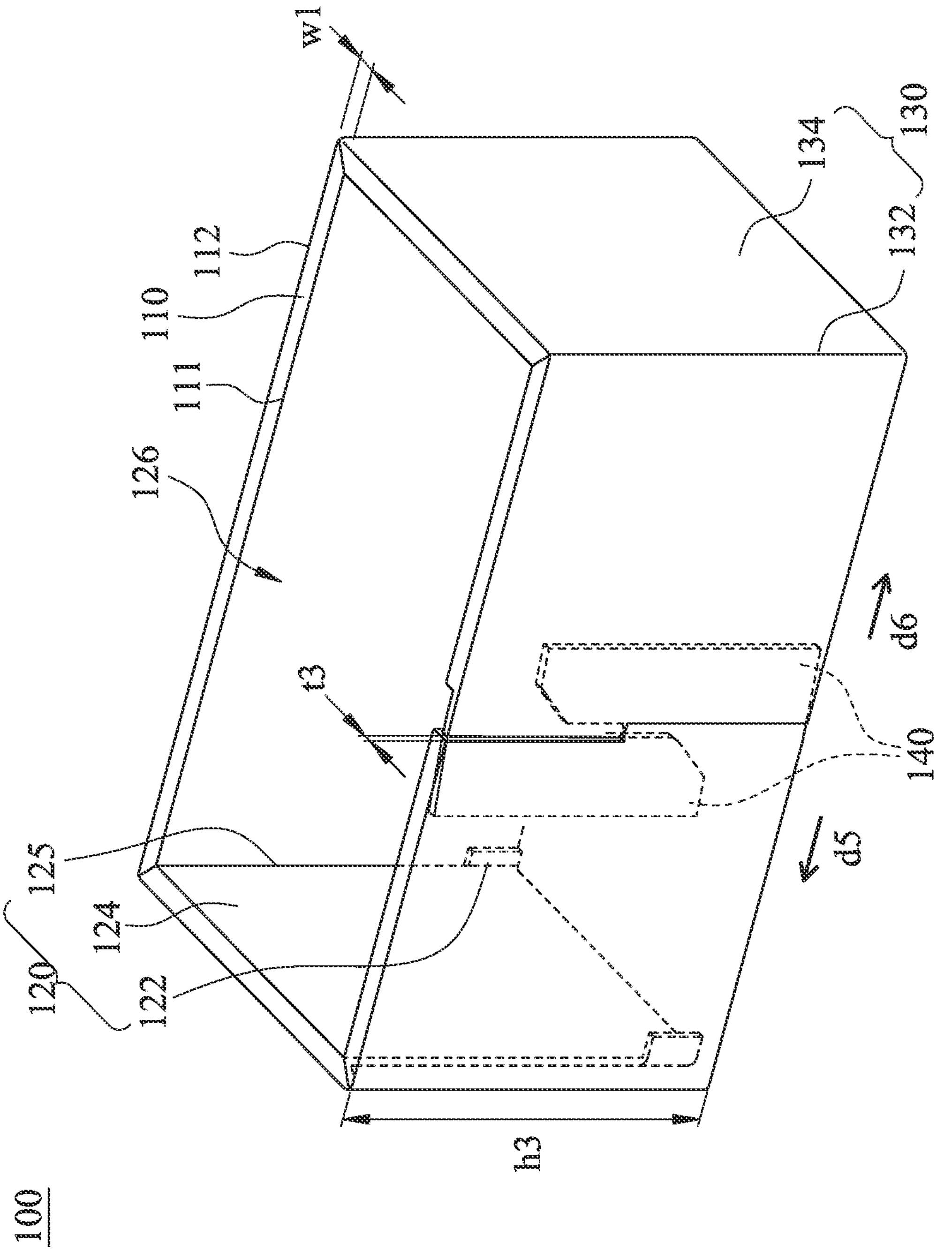
FIG. 1 is a three-dimensional view of a buffer structure according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

FIG. 1 is a three-dimensional view of a buffer structure 100 according to a first embodiment of the present disclosure. Referring to FIG. 1, the buffer structure 100 according to a first embodiment includes at least one internal main layer 120, at least one external main layer 130, and a rib portion 110. The internal main layer 120 has an inner side and an outer side. An accommodating space 126 is formed by the inner side of the internal main layer 120. The external main layer 130 is located at and surrounds the outer side of the internal main layer 120. The rib portion 110 is located between two first folding lines (first folding lines 111, 112, specifically) and forms a ring shape. The first folding lines 111, 112 are parallel to each other. The rib portion 110 is connected between the internal main layer 120 and the external main layer 130, and at least a part of the rib portion 110 is a plane having the same normal direction. Specifically, the first folding line 111 is directly connected to the internal main layer 120, and the first folding line 112 is directly connected to the external main layer 130. As such, the buffer structure 100 has the following features: low cost, high packing efficiency, and good protection ability. In addition, the accommodating space 126 is configured to contain an object/item/article/content, and the buffer structure 100 can provide buffer and protection to the object. Moreover, the ring shape formed by the rib portion of the buffer structure according to the present disclosure can be a closed ring shape or an open ring shape with a slit (smaller gap) or a gap (wider slit) so as to correspondingly form an accommodating space.

In detail, the buffer structure 100 can be integrally formed. In other words, the buffer structure 100 can be formed by a single structural material of any type, and the material can be elastic or non-elastic. Thus, the buffer structure 100 is good in reducing assembly time and cost, thereby achieving low cost, high manufacturing rate, and good fixity (stability). Further, the buffer structure 100 can also be made by assembling multiple structural materials of the same type or different types.

The buffer structure 100 can be formed by folding a paper pasteboard or a plastic pasteboard like a paper board with filling layers or a plastic board with filling layers. Therefore, the bent or folded buffer structure 100 has firmer and stronger supporting strength at corners that are formed by bending or folding along the first folding lines 111, 112, the second outer folding lines 132, and the second inner folding lines 122. The buffer structure 100 is thus equipped with stronger strength and capable of providing better buffering to the object in the accommodating space 126.

The rib portion 110 can form a polygon shape. In the first embodiment, the rib portion 110 forms a rectangle so that the buffer structure 100 becomes a buffer structure for the inside or the outside of the most common rectangular case body. In other embodiments, the rib portion of the buffer structure can be circular, oval, equilateral triangular or scalene triangular, pentagonal, hexagonal, etc., and the present disclosure is not limited thereby.

In the first embodiment, the external main layer 130 can include four second outer folding lines 132 and five external surface portions 134. The five external surface portions 134 are distinguished or divided or separated by the four second outer folding lines 132 sequentially, in other words, the four second outer folding lines 132 and the five external surface portions 134 are alternately arranged. The four second outer folding lines 132 are perpendicular to each of the two first folding lines 111, 112 and are parallel to each other. The internal main layer 120 can include four hollow portions 125 and five internal surface portions 124. The five internal surface portions 124 are distinguished or divided or separated by the four hollow portions 125 sequentially, in other words, the four hollow portions 125 and the five internal surface portions 124 are alternately arranged. Adjacent two of the internal surface portions 124 may overlap or contact at one of the hollow portions 125 thereinbetween as shown in FIG. 1. Each of the hollow portions 125 is in an elongated shape and perpendicular to each of the first folding lines 111, 112. The four hollow portions 125 are parallel to each other. The number of the internal surface portions 124 and the number of the external surface portions 134 are equal and are both five, and the five internal surface portions 124 correspond respectively and are parallel to the five external surface portions 134. Hence, the buffer structure 100 is able to match the shape of the case body in the packaging set so as to achieve better buffering ability.

In the first embodiment, the internal main layer 120 can further include four second inner folding lines 122 that correspond respectively to the four hollow portions 125. Each of the hollow portions 125 is located between the rib portion 110 and a corresponding one of the second inner folding lines 122. As such, the shape of the buffer structure 100 is held in place through the second inner folding lines 122 that correspond respectively to the hollow portions 125.

The width w1 of the rib portion 110 can be between 2 mm and 50 mm (including 2 mm and 50 mm, and similar wording in the present disclosure all includes the end values of the range), which helps the buffer structure 100 to have better buffering function and to retain from deformation. In the first embodiment, the width w1 of the rib portion is specifically 4 mm.

The thickness of the internal main layer 120 and the thickness t3 of the external main layer 130 can be equal, and the ratio of the width w1 of the rib portion 110 to the thickness t3 of the external main layer 130 is between 2 and 16. The buffer structure 100 is thus less likely to be tilted or crooked so as to achieve a symmetric and balanced buffer effect. Furthermore, the ratio of the width w1 of the rib portion 110 to the thickness t3 of the external main layer 130 can be preferably between 2 and 6. In addition, the width w1 of the rib portion 110 minus the thickness of the internal main layer 120 and the thickness t3 of the external main layer 130 can be between 1.5 mm and 8 mm, and preferably between 2 mm and 3 mm. In the first embodiment, the width w1 of the rib portion 110 is specifically 4 mm, the thickness of the internal main layer 120 and the thickness t3 of the external main layer 130 are specifically both 1 mm, the width w1 of the rib portion 110 minus the thickness of the internal main layer 120 and the thickness t3 of the external main layer 130 is specifically 2 mm, and the ratio of the width w1 of the rib portion 110 to the thickness t3 of the external main layer 130 is specifically 4.

Figure 2A:
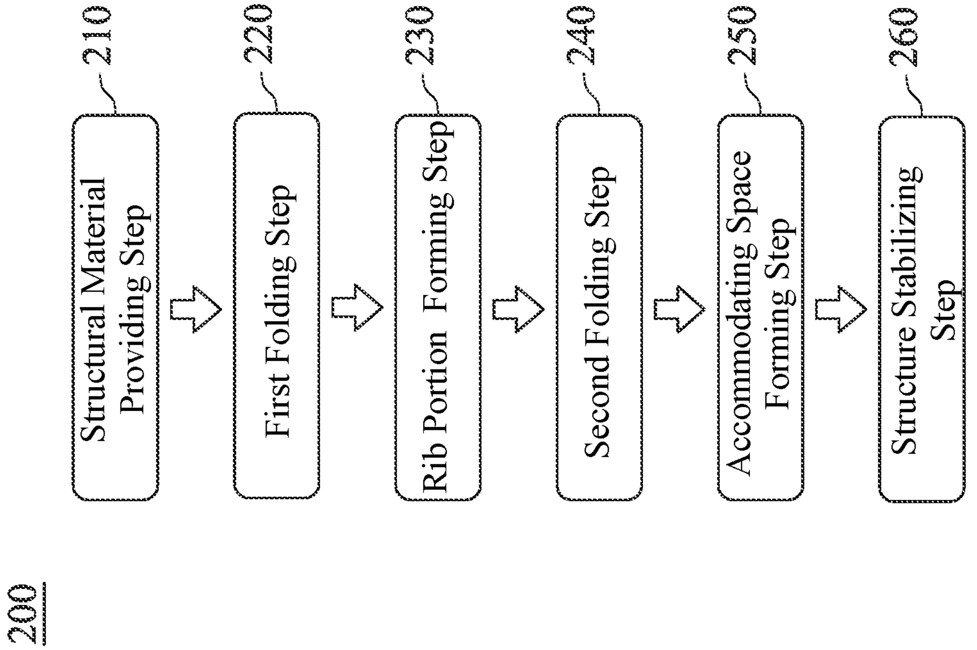
FIG. 2A is a flow chart of a buffer structure forming method according to a second embodiment of the present disclosure.
Figure 2B:
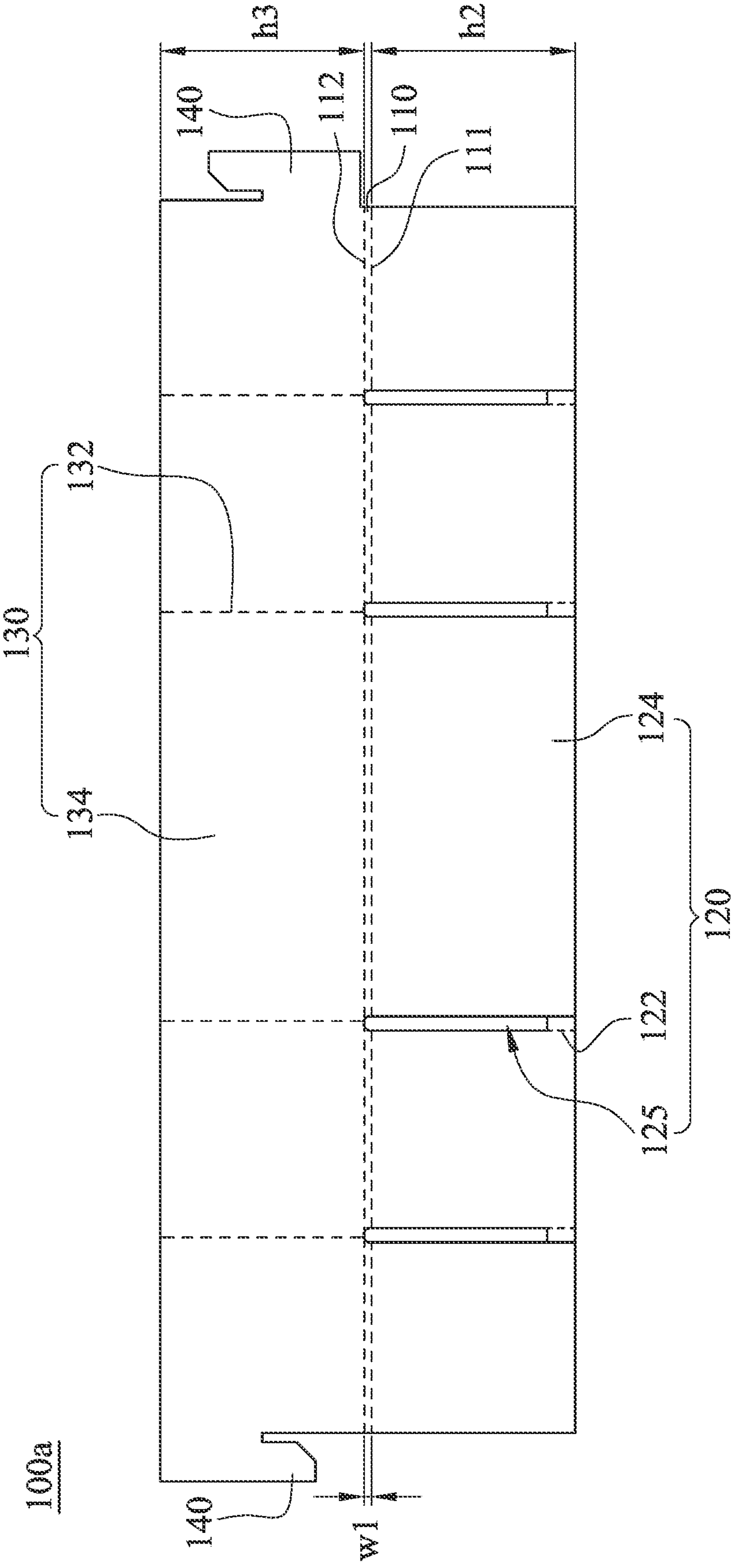
FIG. 2B is a schematic diagram illustrating a structural material in a structural material providing step of the buffer structure forming method according to the second embodiment.

As shown in FIG. 1 and FIG. 2B, the height h2 of the internal main layer 120 and the height h3 of the external main layer 130 can be equal, which helps the buffer structure 100 to provide balanced and complete buffering in the height direction.

The buffer structure 100 can further include two locking portions 140. The two locking portions 140 are connected to at least one of the internal main layer 120 and the external main layer 130 and are connected to one another to hold the buffer structure 100 in shape and to stabilize the shape of the buffer structure 100. As such, the rib portion 110 of the buffer structure 100 forms a closed ring shape or an approximately closed ring shape (a ring shape or an enclosure with extremely small slit), which helps the buffer structure 100 to achieve balanced and complete buffering effect in the ring/annular direction.

The rib portion 110 may form a polygon shape, and each of the locking portions 140 corresponds in position to one side of the polygon shape, which helps to enhance the formation efficiency of the buffer structure 100. According to the embodiments of the present disclosure, when the rib portion of the buffer structure forms a rectangle shape, and each of two locking portions corresponds in position to one side of the rectangle shape, the number of second outer folding lines and the number of hollow portions are both four, the number of internal surface portions and the number of external surface portions are both five, and the two external surface portions or the two internal surface portions that are connected respectively to the two locking portions are located at the one side of the rectangle shape, as shown in FIG. 1. Moreover, when the rib portion of the buffer structure forms a rectangle shape and the two locking portions of the buffer structure correspond in position to a corner of the rectangle shape, the number of second outer folding lines and the number of hollow portions are both three, and the number of external surface portions and the number of surface internal surface portions are both four.

Referring to FIG. 1, the two locking portions 140 can be directly connected to the external main layer 130 and extend from the external main layer 130 along the ring shape formed by the rib portion 110 in the clockwise direction d5 and the counter-clockwise direction d6, respectively, and the two locking portions 140 engage with one another and are both located at the inner side of the external main layer 130 and the outer side of the internal main layer 120. As such, the convenience in forming the buffer structure 100 is improved. In the embodiments of the present disclosure, the two locking portions of the buffer structure can be locked/engaged/fixed by hooking means as the two locking portions 140 shown in FIG. 1 and FIG. 2E, but the two locking portions can also be fixed through adhesive means, tucking means, etc. and the present disclosure is not limited thereto.

According to the embodiments of the present disclosure, the number of at least one internal main layer of the buffer structure is at least two (not shown), and the two internal main layers are separated/defined/distinguished/divided by a third inner folding line that serves as a border between the two internal main layers. The third inner folding line is parallel to each of the two first folding lines. One of the two internal main layers is located at the inner side of the external main layer and the outer side of the other one of the two internal main layers. Hence, the buffer structure having equal to or more than three layers from internal to external has better buffering ability and high packing efficiency.

According to the embodiments of the present disclosure, the number of at least one external main layer of the buffer structure is at least two (not shown), and the two external main layers are separated/defined/distinguished/divided by a third outer folding line that serves as a border between the two external main layers. The third outer folding line is parallel to each of the two first folding lines. One of the two external main layers is located at the outer side of the internal main layer and the inner side of the other one of the two external main layers. Hence, the buffer structure having equal to or more than three layers from internal to external has better buffering ability and high packing efficiency.

FIG. 2A is a flow chart of a buffer structure forming method 200 according to a second embodiment of the present disclosure. Referring to FIG. 2A, the buffer structure forming method 200 includes a structural material providing step 210, a first folding step 220, a rib portion forming step 230, and an accommodating space forming step 250.

FIG. 2B is a schematic diagram illustrating a structural material 100*a* in the structural material providing step 210 of the buffer structure forming method 200 according to the second embodiment, and the dotted lines in FIG. 2B represent the first folding lines 111, 112, the second outer folding lines 132, the second inner folding lines 122, which are for folding. Referring to FIG. 2A and FIG. 2B, the structural material providing step 210 includes providing the structural material 100*a*. The structural material 100*a* includes the first folding lines 111, 112 and is used to be folded to form the buffer structure 100 in the first embodiment as shown in FIG. 1.

Figure 2C:
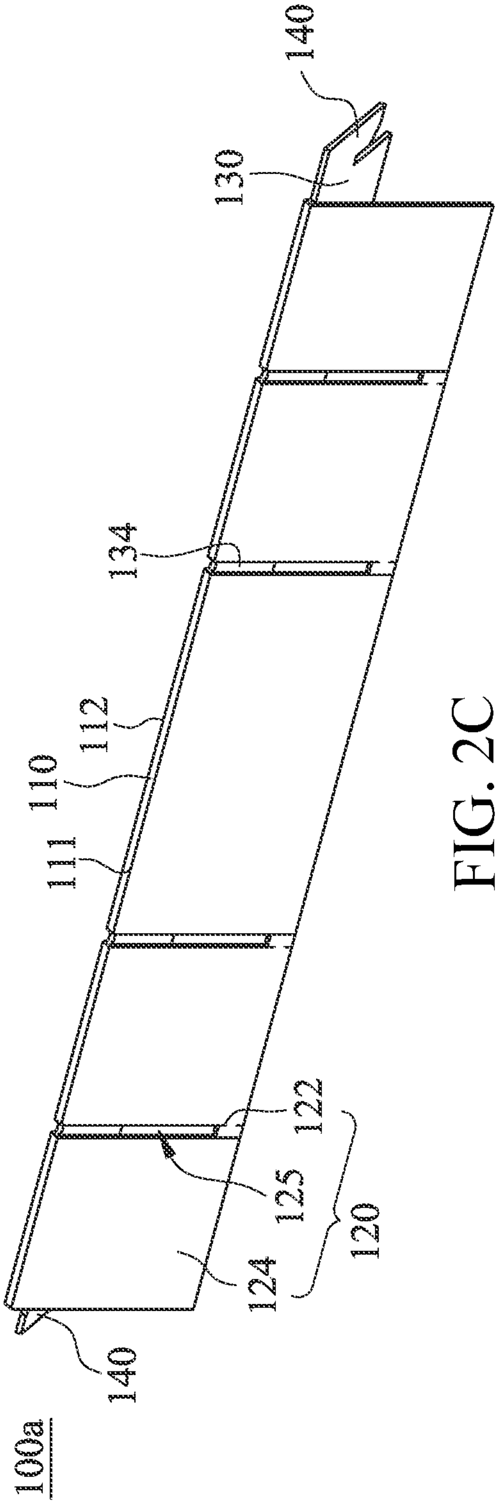
FIG. 2C is a schematic diagram illustrating the structural material in a first folding step of the buffer structure forming method according to the second embodiment.

FIG. 2C is a schematic diagram illustrating the structural material 100*a* in the first folding step 220 of the buffer structure forming method 200 according to the second embodiment. Referring to FIG. 2A and FIG. 2C, the first folding step 220 includes folding the structural material 100*a* along the first folding line 111 to form the internal main layer 120 and folding along the first folding line 112 to form the external main layer 130.

Figure 2D:
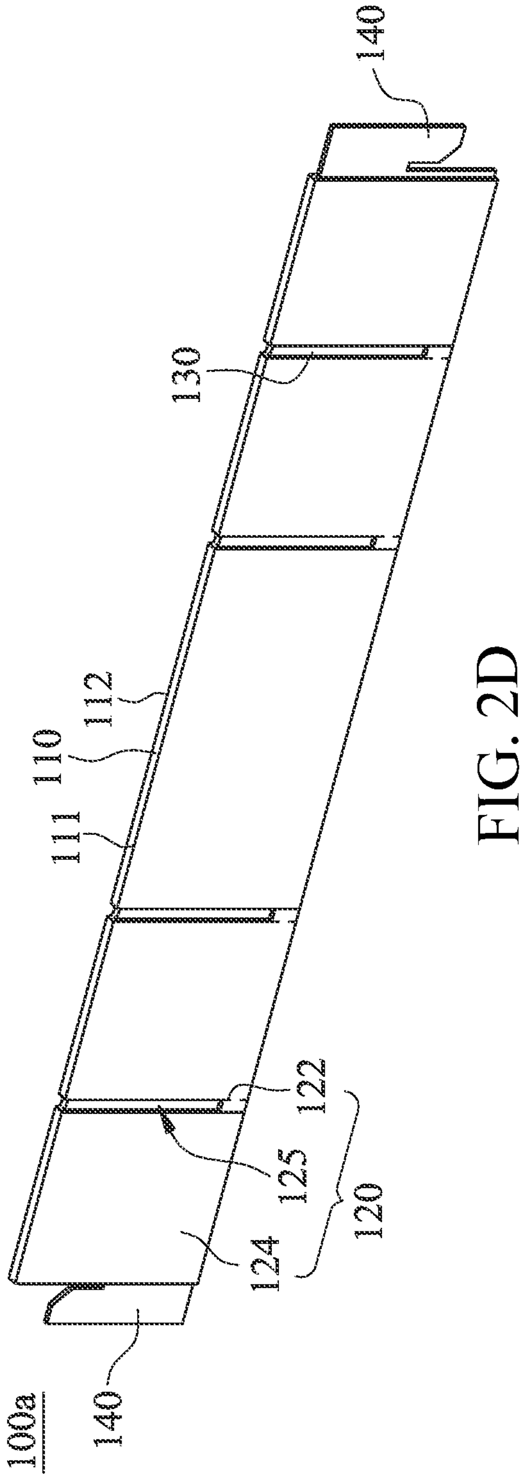
FIG. 2D is a schematic diagram illustrating the structural material in a rib portion forming step of the buffer structure forming method according to the second embodiment.

FIG. 2D is a schematic diagram illustrating the structural material 100*a* in the rib portion forming step 230 of the buffer structure forming method 200 according to the second embodiment. Referring to FIG. 2A and FIG. 2D, in the rib portion forming step 230, the rib portion 110 is formed between the first folding lines 111, 112. At least a part of the rib portion 110 is a plane that has the same normal direction.

Figure 2E:
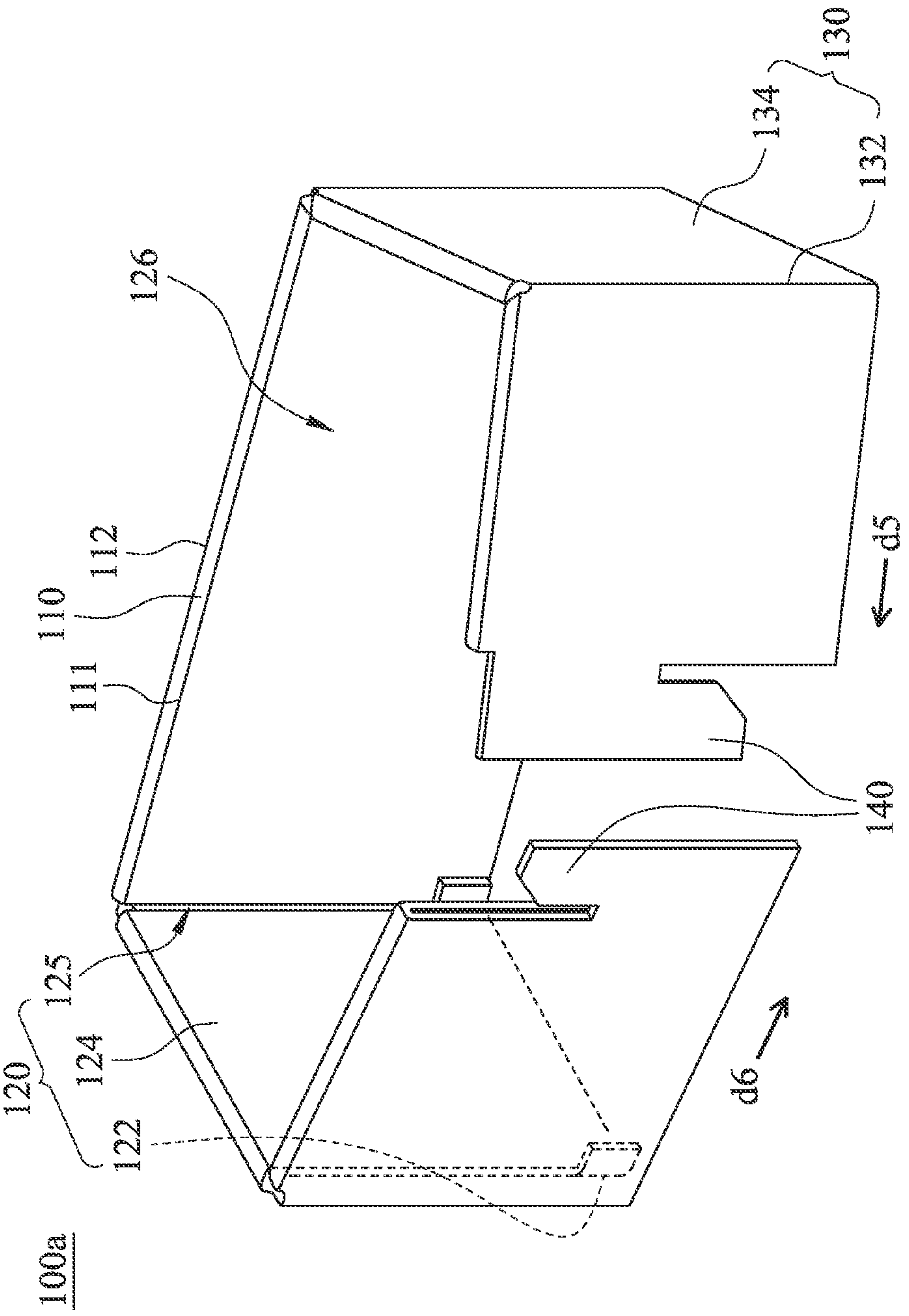
FIG. 2E is a schematic diagram illustrating the structural material in an accommodating space forming step of the buffer structure forming method according to the second embodiment.

FIG. 2E is a schematic diagram illustrating the structural material 100*a* in the accommodating space forming step 250 of the buffer structure forming method 200 according to the second embodiment. Referring to FIG. 1, FIG. 2A and FIG. 2E, in the accommodating space forming step 250, the accommodating space 126 is formed by/at the inner side of the internal main layer 120, the external main layer 130 is located at and surrounds the outer side of the internal main layer 120, and the rib portion 110 forms a ring shape, as shown in FIG. 1 and FIG. 2E. Hence, the buffer structure 100 formed by the buffer structure forming method 200 is configured to support the object (item to be packaged) with easy packaging method and is convenient to apply to packaging set that needs enforced packaging strength and to the inside or outside of the case body in the packaging set.

More specifically, the external main layer 130 can include the plurality of second outer folding lines 132, and the internal main layer 120 can include the plurality of hollow portions 125. Each of the hollow portions 125 as well as each of the second outer folding lines 132 is perpendicular to each of the first folding lines 111, 112. The number of the hollow portions 125 and the number of the second outer folding lines 132 are equal, and the hollow portions 125 correspond respectively to the second outer folding lines 132. Moreover, the internal main layer 120 can further include the plurality of second inner folding lines 122 that correspond respectively to the plurality of hollow portions

125, and each of the hollow portions 125 is located between the rib portion 110 and the corresponding one of the second inner folding lines 122.

Referring to FIG. 2A and FIG. 2E, the buffer structure forming method 200 can further include a second folding step 240 that includes folding the structural material 100*a* along the second outer folding lines 132, respectively, to form the plurality of external surface portions 134, and folding the structural material 100*a* along the hollow portions 125 and the second inner folding lines 122, respectively, to form the plurality of internal surface portions 124. As such, the buffer structure 100 is able to further match the shape of other elements in the packaging set so as to provide better buffering.

Referring to FIG. 2B, the structural material 100*a* can further include the two locking portions 140. The two locking portions 140 are respectively connected to two ends of one of the external main layer 130 and the internal main layer 120 along two opposite directions of each of the first folding lines 111, 112. In this embodiment, the locking portions 140 are connected to the external main layer 130.

Referring to FIG. 1 and FIG. 2A, the buffer structure forming method 200 can further include a structure stabilizing step 260. In the structure stabilizing step 260, the two locking portions 140 are engaged with one another to stabilize the shape of the buffer structure 100 and hold the buffer structure 100 in shape as shown in FIG. 1. Therefore, the buffer structure 100 is able to provide balanced and complete buffer ability in the ring/annular direction.

Figure 3A:
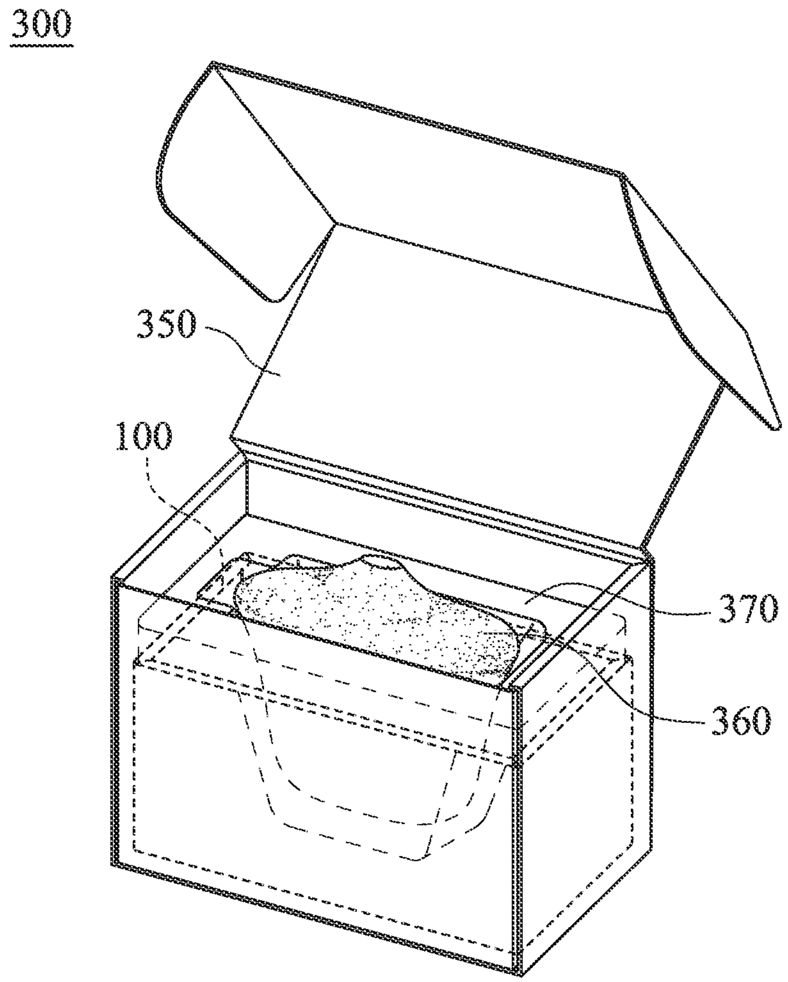
FIG. 3A is a three-dimensional view of a packaging set according to a third embodiment of the present disclosure.
Figure 3B:
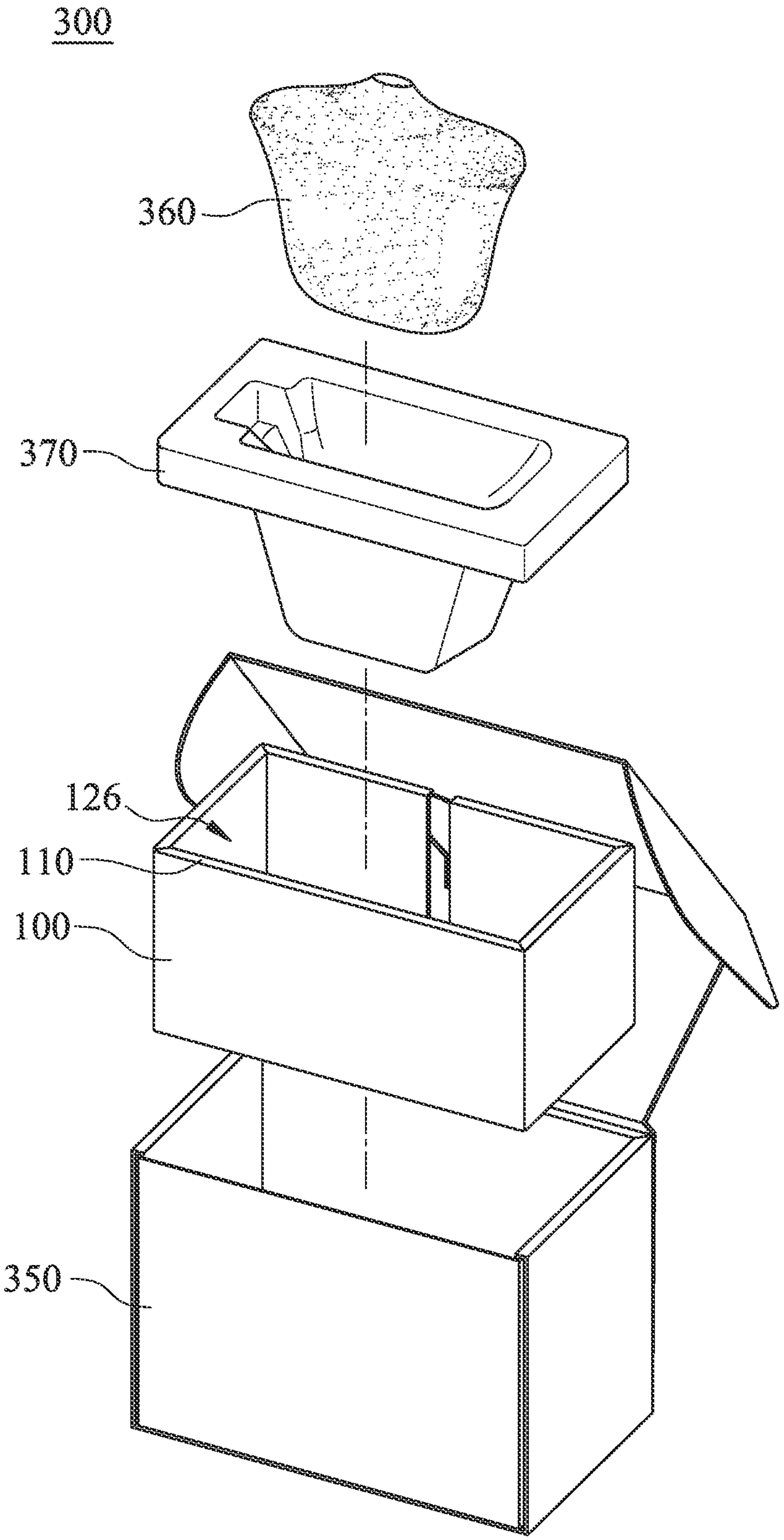
FIG. 3B is an exploded view of the packaging set according to the third embodiment.

FIG. 3A is a three-dimensional view of a packaging set 300 according to a third embodiment of the present disclosure, and FIG. 3B is an exploded view of the packaging set 300 according to the third embodiment. Referring to FIG. 3A and FIG. 3B, a packaging set 300 according to the third embodiment includes the buffer structure 100 of the first embodiment and a case body 350. The case body 350 is disposed at and connected to the outer side or the inner side of the buffer structure 100. Thus, the packaging set 300 is low cost, easy to pack, and with good protective ability.

In detail, the case body 350 is specifically disposed at and connected to and surrounds the outer side of the buffer structure 100. The packaging set 300 further includes an object 360 which is disposed/placed in the accommodating space 126 of the buffer structure 100, thereby providing a packaging solution that is low cost, has high packing efficiency, and provides good protection to the object 360.

The packaging set 300 may further include a tray element 370. The four side portions of the tray element 370 are disposed/placed on and held by the rib portion 110 of the buffer structure 100, and the central portion of the tray element 370 is concaved so as to hold and contain the object 360 in the tray element 370. Thus, the combination of the buffer structure 100 and the tray element 370 is able to provide better buffering according to the shape of the object 360.

The buffer structure 100 can be integrally formed by folding a single corrugated paper (single-layer corrugated cardboard), and the rib portion 110 forms a rectangle shape. Therefore, the folded buffer structure 100 is a double-layer buffer structure which is composed of the external main layer 130 and the internal main layer 120, and its protective strength is greater than the conventional single-layer buffer structure which is composed of a thicker material like double corrugated paper.

Figure 4:
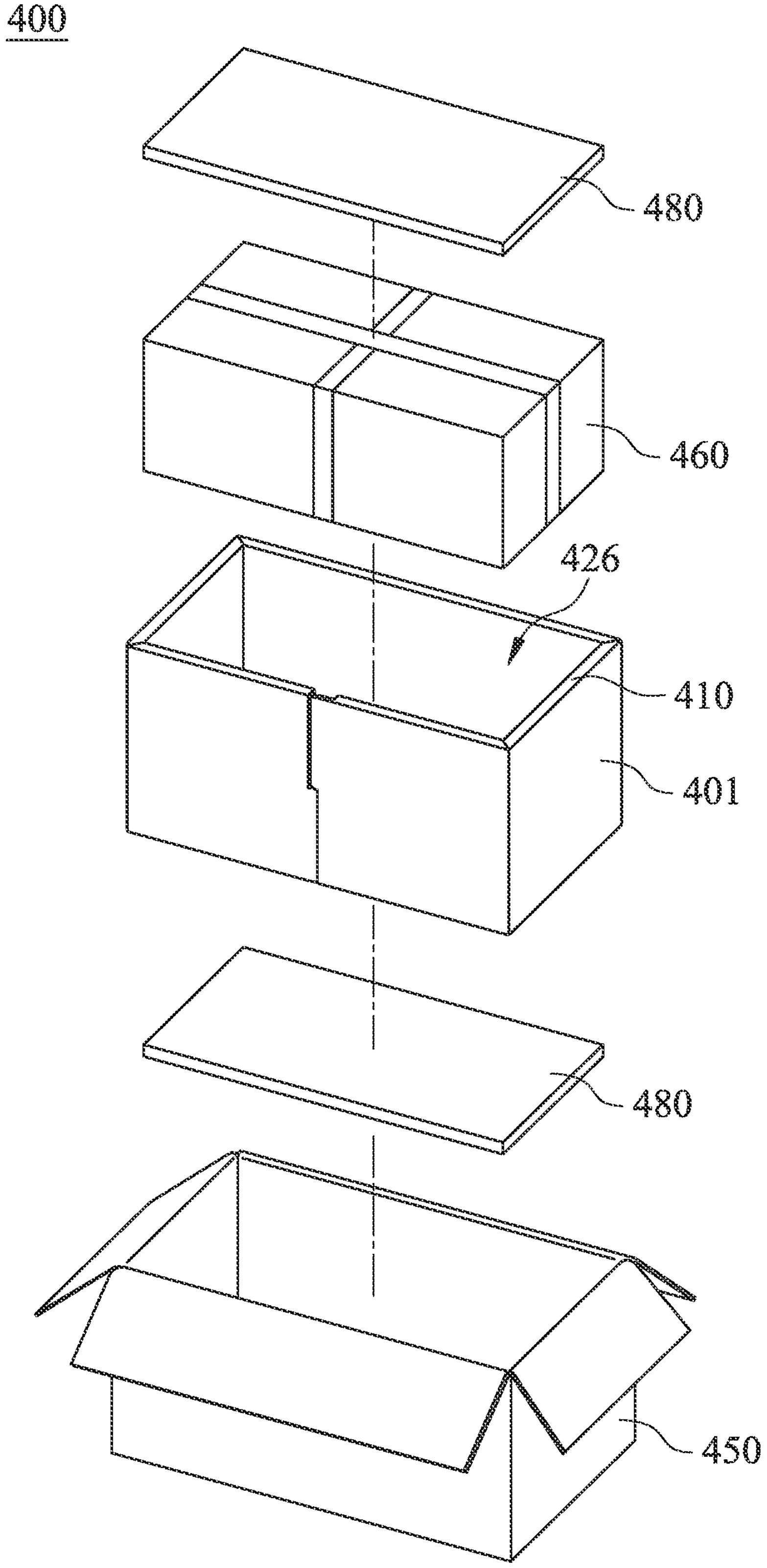
FIG. 4 is an exploded view of a packaging set according to a fourth embodiment of the present disclosure.

FIG. 4 is an exploded view of a packaging set 400 according to a fourth embodiment of the present disclosure. Referring to FIG. 4, the packaging set 400 according to the fourth embodiment includes a buffer structure 401 of the present disclosure and a case body 450.

In detail, the case body 450 is disposed at and connected to and surrounds the outer side of the buffer structure 401. The packaging set 400 further includes an object 460 that is disposed/placed in the accommodating space 426 of the buffer structure 401. The buffer structure 401 can be integrally formed by folding a single corrugated paper, and the rib portion 410 of the buffer structure 401 forms a rectangle shape. Further, two protection boards 480 are respectively disposed on the top side and the bottom side of the buffer structure 401.

Figure 5:
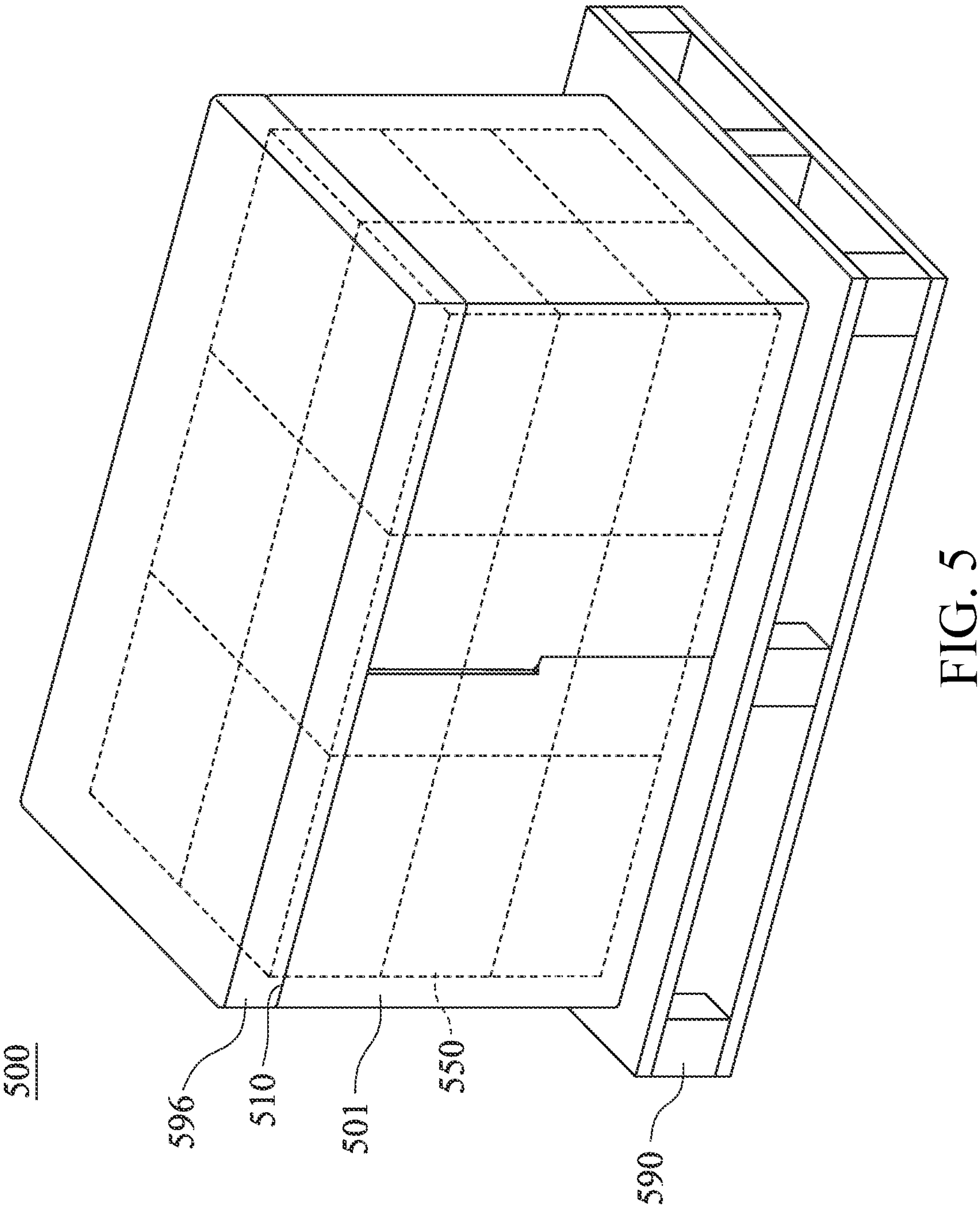
FIG. 5 is a three-dimensional view of a packaging set according to a fifth embodiment of the present disclosure.

FIG. 5 is a three-dimensional view of a packaging set 500 according to a fifth embodiment of the present disclosure. Referring to FIG. 5, the packaging set 500 according to a fifth embodiment includes a buffer structure 501 of the present disclosure and a plurality of case bodies 550.

In detail, the plurality of case bodies 550 are specifically stacked on a pallet 590 and are disposed at and connected to the inner side of the buffer structure 501. The buffer structure 501 surrounds the plurality of case bodies 550, and a top cover 596 is disposed on the top side of the plurality of case bodies 550 and the top side of the buffer structure 501. The packaging set 500 further includes a plurality of objects (not shown) that are respectively placed in the case body accommodating spaces of the case bodies 550. In other words, the objects are placed in the accommodating space of the buffer structure 501, thereby the plurality of case bodies 550 and the objects disposed therein are protected by the buffer structure 501. The buffer structure 501 can be integrally formed by folding a single corrugated paper, and a rib portion 510 of the buffer structure 501 forms a rectangle shape.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A buffer structure, comprising:

at least one internal main layer having an inner side and an outer side, wherein the inner side forms an accommodating space;

at least one external main layer surrounding the outer side of the at least one internal main layer; and a rib portion located between two first folding lines, wherein the two first folding lines are parallel to each other, one of the two first folding lines is connected to the at least one internal main layer, the other one of the two first folding lines is connected to the at least one external main layer, and the rib portion is connected between the at least one internal main layer and the at least one external main layer and forms a ring shape by folding.

2. The buffer structure of claim 1, wherein the buffer structure is integrally formed.

3. The buffer structure of claim 1, wherein the buffer structure is formed by folding a paper pasteboard or a plastic pasteboard.

4. The buffer structure of claim 1, wherein a width of the rib portion is between 2 mm and 50 mm.

5. The buffer structure of claim 1, wherein a thickness of the at least one internal main layer is equal to a thickness of the at least one external main layer, and a ratio of a width of the rib portion to the thickness of the at least one external main layer is between 2 and 16.

6. The buffer structure of claim 1, further comprising:

two locking portions connected to at least one of the at least one internal main layer and the at least one external main layer, wherein the two locking portions are connected with one another to stabilize a shape of the buffer structure.

7. The buffer structure of claim 6, wherein the rib portion forms a polygon shape, and each of the two locking portions corresponds in position to one side of the polygon shape.

8. The buffer structure of claim 6, wherein the two locking portions are connected to the at least one external main layer and extend from the at least one external main layer along the ring shape in a clockwise direction and a counter-clockwise direction, respectively, and the two locking portions engage with one another and are located at an inner side of the at least one external main layer and the outer side of the at least one internal main layer.

9. The buffer structure of claim 1, wherein a number of the at least one internal main layer is at least two, the at least two internal main layers are separated by a third inner folding line that is parallel to each of the two first folding lines, and one of the at least two internal main layers is located at an inner side of the at least one external main layer and the outer side of the other one of the at least two internal main layers.

10. The buffer structure of claim 1, wherein a number of the at least one external main layer is at least two, the at least two external main layers are separated by a third outer folding line that is parallel to each of the two first folding lines, and one of the at least two external main layers is located at the outer side of the at least one internal main layer and an inner side of the other one of the at least two external main layers.

11. A packaging set, comprising:

a buffer structure of claim 1; and a case body disposed at and connected to an outer side or an inner side of the buffer structure.

12. The packaging set of claim 11, wherein the case body is disposed at and connected to the outer side of the buffer structure, and the packaging set further comprises:

an object disposed in the accommodating space of the buffer structure.

13. The packaging set of claim 12, further comprising:

a tray element disposed on and held by the rib portion of the buffer structure, wherein the object is held by the tray element.

14. The packaging set of claim 11, wherein the buffer structure is integrally formed by folding a single corrugated paper, and the rib portion forms a rectangle shape.

15. A buffer structure, comprising:

at least one internal main layer having an inner side and an outer side, wherein the inner side forms an accommodating space;

at least one external main layer surrounding the outer side of the at least one internal main layer; and a rib portion located between two first folding lines, wherein the two first folding lines are parallel to each other, one of the two first folding lines is connected to the at least one internal main layer, the other one of the two first folding lines is connected to the at least one external main layer, and the rib portion is connected between the at least one internal main layer and the at least one external main layer and forms a ring shape;

wherein the at least one external main layer comprises a plurality of second outer folding lines and a plurality of external surface portions that are sequentially separated by the plurality of second outer folding lines, each of the plurality of second outer folding lines is perpendicular to each of the two first folding lines, and the plurality of second outer folding lines are parallel to each other;

wherein the at least one internal main layer comprises a plurality of hollow portions and a plurality of internal surface portions that are sequentially separated by the plurality of hollow portions, each of the plurality of hollow portions is in an elongated shape and perpendicular to each of the two first folding lines, the plurality of hollow portions are parallel to each other, a number of the plurality of internal surface portions is equal to a number of the plurality of external surface portions, and the plurality of internal surface portions correspond respectively to the plurality of external surface portions;

wherein the rib portion forms a polygon shape.

16. The buffer structure of claim 15, wherein the at least one internal main layer further comprises a plurality of second inner folding lines that correspond respectively to the plurality of hollow portions, and each of the plurality of hollow portions is located between the rib portion and a corresponding one of the plurality of second inner folding lines.

17. A buffer structure, comprising:

at least one internal main layer having an inner side and an outer side, wherein the inner side forms an accommodating space;

at least one external main layer surrounding the outer side of the at least one internal main layer; and a rib portion located between two first folding lines, wherein the two first folding lines are parallel to each other, one of the two first folding lines is connected to the at least one internal main layer, the other one of the two first folding lines is connected to the at least one external main layer, and the rib portion is connected between the at least one internal main layer and the at least one external main layer and forms a ring shape;

wherein a height of the at least one internal main layer is equal to a height of the at least one external main layer.

* * * * *